United States Patent [19]

Bilir

[11] Patent Number: 5,923,099
[45] Date of Patent: Jul. 13, 1999

[54] INTELLIGENT BACKUP POWER CONTROLLER

[75] Inventor: Adnan Bilir, Salinas, Calif.

[73] Assignee: Lam Research Corporation, Fremont, Calif.

[21] Appl. No.: 08/940,053

[22] Filed: Sep. 30, 1997

[51] Int. Cl.[6] ........................................... G06F 1/30
[52] U.S. Cl. .................. 307/64; 307/66; 395/182.12; 395/750.03; 395/750.06; 364/528.3
[58] Field of Search .................. 307/64, 66; 395/182.12, 395/750.03, 750.06, 182.22; 364/528.27, 528.3

[56] References Cited

U.S. PATENT DOCUMENTS

| | | |
|---|---|---|
| 4,143,283 | 3/1979 | Graf et al. . |
| 4,298,946 | 11/1981 | Hartsell et al. . |
| 4,611,289 | 9/1986 | Coppola . |
| 4,692,145 | 9/1987 | Weyant ..................................... 307/66 |
| 4,799,185 | 1/1989 | Taylor ................................. 395/182.12 |
| 5,128,552 | 7/1992 | Fang et al. ................................ 307/64 |
| 5,315,161 | 5/1994 | Robinson et al. .................. 395/182.22 |
| 5,317,752 | 5/1994 | Jewett et al. . |
| 5,381,554 | 1/1995 | Langer et al. . |
| 5,748,972 | 5/1998 | Clark et al. ......................... 395/750.06 |

*Primary Examiner*—Albert W. Paladini
*Attorney, Agent, or Firm*—Burns, Doane, Swecker & Mathis, L.L.P.

[57] ABSTRACT

An intelligent backup controller performs graceful shutdown of a processing system upon the loss of main AC power. The power source supply is monitored to detect a switch from main AC power to backup power, triggering a sequence of events effecting the graceful shutdown of the processing system. These events include the steps of notifying the operating system of the processing system to commence shutdown procedures, triggering a first timer beginning with detection of the switch from main AC power to backup power, triggering a second timer upon receipt of a shutdown complete indication from the operating system, and terminating provision at the expiration of either timer unless main AC power is restored during the process. The intelligent backup controller can comprise PC-ISA based printed circuit board having a programmable logic device which serves to effect the monitoring and control functions, along with a serial port emulator for interfacing with the equipment being controlled.

21 Claims, 3 Drawing Sheets

INTELLIGENT BACKUP POWER CONTROLLER

BACKGROUND OF THE INVENTION

1. Field of the Invention

The invention relates to backup power supplies, and more particularly, to a system which detects and responds to changes in condition of a backup power supply.

2. Description of Related Art

The function of a traditional UPS (uninterruptible power supply) is to provide backup power to a system such as a PC (Personal Computer) in case of main power loss. This backup power enables the user of the system to close software applications and shut down the system to avoid data loss and file corruption which could occur if the system power is suddenly interrupted. However, the backup capacity of a UPS is normally limited to a few minutes, with the cost of the UPS being in proportion to the length of available backup time provided.

Problems arise when main power loss occurs while the system is unattended, or when, as in some applications, the data input devices which would normally allow the operator to perform graceful shutdown of the system are deliberately disabled, for safety or other reasons, upon the loss of main power. In these situations, performance of graceful shutdown is precluded, with a disruptive shutdown occurring at the expiration of backup power life if main power is not restored in time, thus inviting conditions for system file corruption and attendant complications. Such complications can result in significant problems—e.g., in situations where the PC is used to control a manufacturing process such as semiconductor etching or chemical vapor deposition (CVD), significant economic losses and time delays can be incurred.

Since the UPS cannot guarantee that backup power will last until main power, which can be main AC or DC power, is restored, there arises the need for a system which will automatically shut down operations in a graceful, nondisruptive manner. It would be desirable for a system to be sensitive to the current operations status of the system and to implement system shutdown only after ascertaining that it is safe to do so.

SUMMARY OF THE INVENTION

The invention solves the foregoing problems and provides additional advantages by providing an intelligent backup power controller which detects a transition from a primary power source to a backup power source in a processing system such as a PC, directs an operating system of the processing system to commence shutdown procedures in response to the transition, and turns off backup power in response to a shutdown completion signal from the operating system that the latter has completed shutdown procedures. The backup power can be turned off some predetermined period of time after receiving the shutdown completion signal.

In one aspect of the invention, the intelligent backup power controller can turn off backup power following a second predetermined period of time commencing at the detection of the transition from the primary power source to the backup power source regardless of receipt of the operating system shutdown completion signal.

In another aspect of the invention, the power source is monitored and shutdown procedures are abandoned if primary power restoration is detected.

The invention further provides a method for performing a graceful shutdown of a processing system upon the loss of main power by sensing a transition from main power to backup power, causing an operating system of the processing system to commence shutdown procedures, triggering a first timer in response to the transition, triggering a second timer in response to a signal from the operating system that shutdown procedures have been completed, and terminating provision of backup power at the expiration of either the first or the second timer.

The invention can be implemented on a printed circuit board as part of a computer architecture. Such an implementation may be PC-ISA based, or based on any of a number of other common buses, depending on the environment in which it is to be utilized. A feature of this implementation is that the device can interface with the operating system of the processing system in a manner analogous to a modem. Such modem emulation can thus eliminate the need for new device driver software.

DESCRIPTION OF THE PREFERRED EMBODIMENTS

Figure 1:
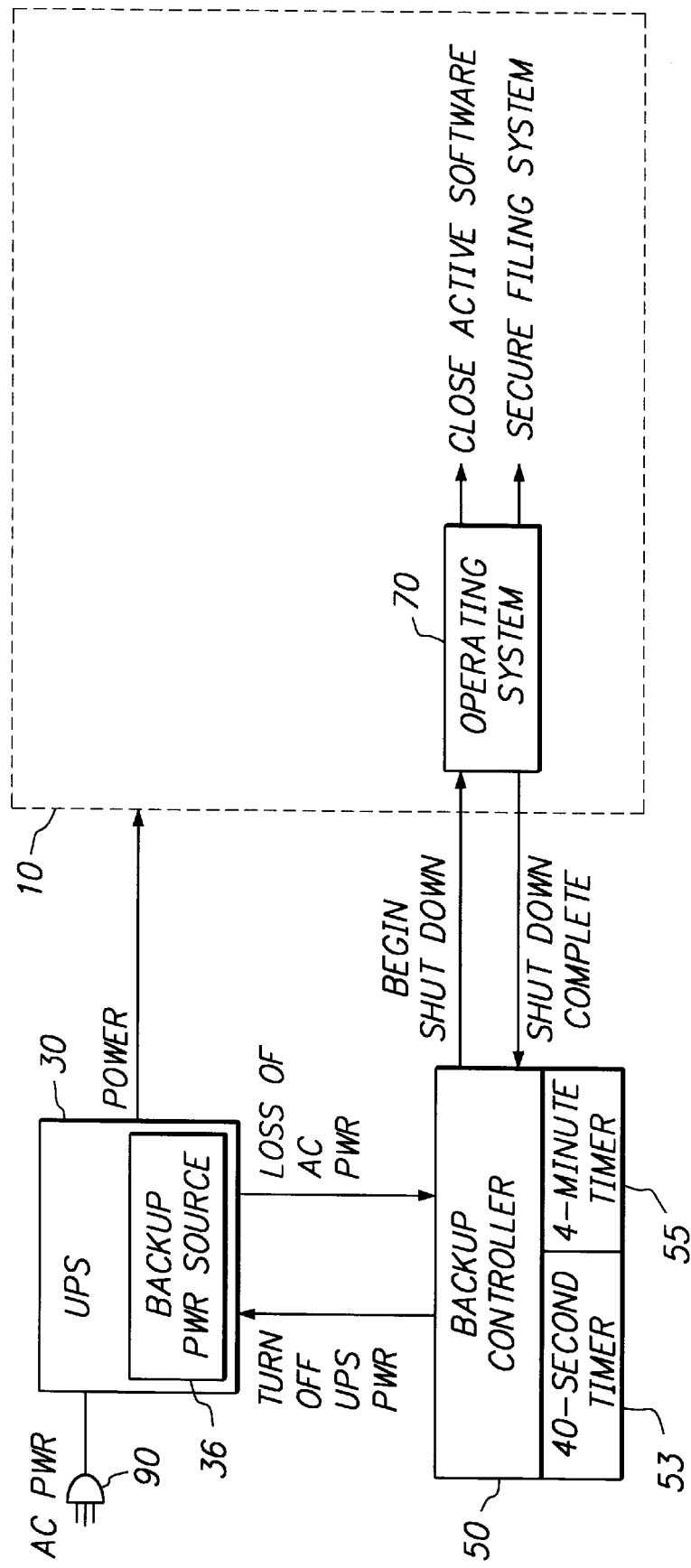
FIG. 1 is a schematic illustration of a backup power arrangement in accordance with the invention.
Figure 2:
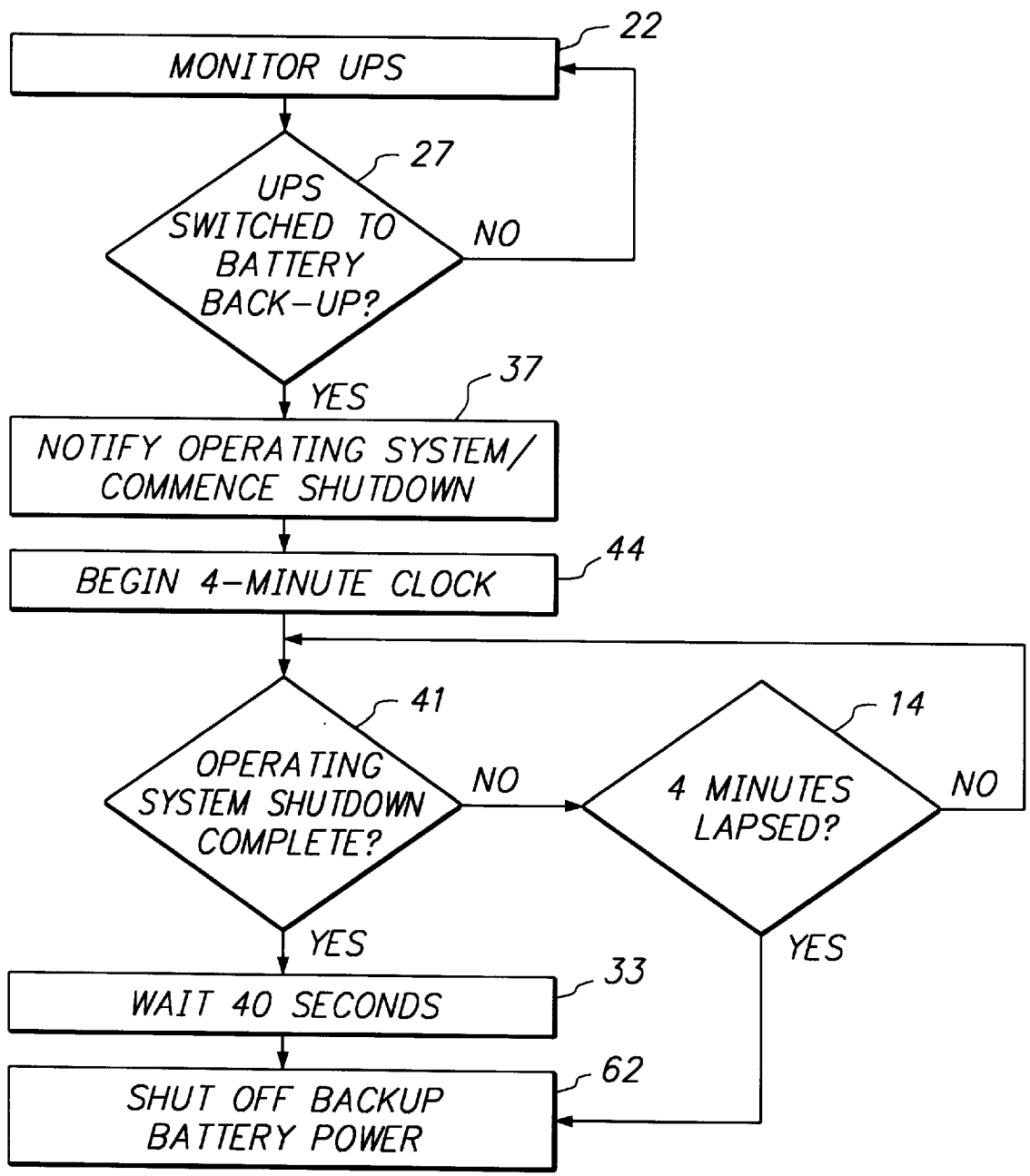
FIG. 2 is a flow chart showing a sequence of operations in accordance with the invention.
Figure 3:
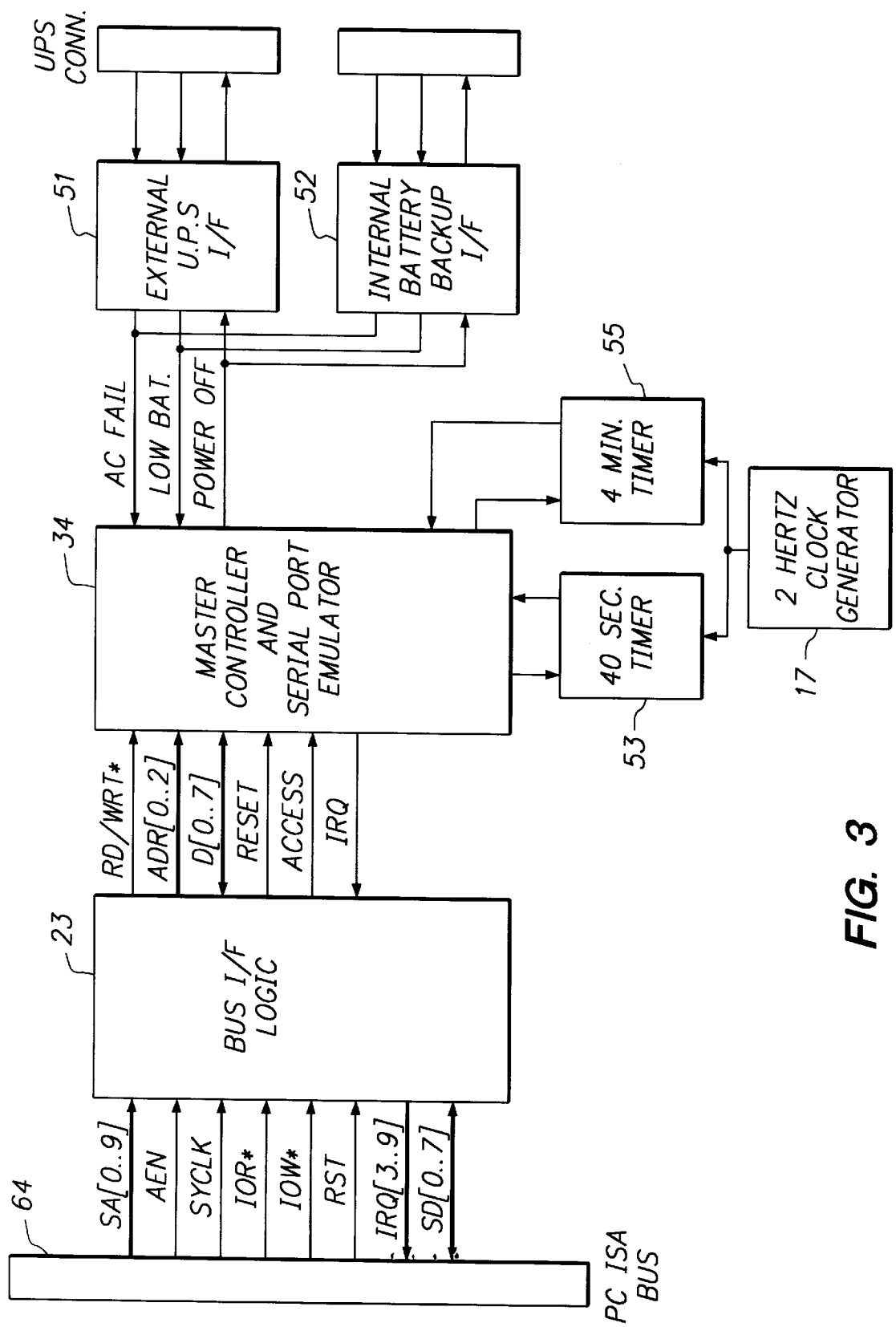
FIG. 3 is a schematic representation of a PC-ISA based PCB implementation of a device in accordance with the invention.

FIGS. 1–3 show the intelligent backup power controller 50 which serves to control the operation of a UPS 30 which powers a processing system 10. Although shown as external to the processing system 10, the intelligent backup power controller 50 and/or the UPS can in practice be incorporated into the processing system 10.

The processing system 10 may be a computer system such as a PC, or any electronic equipment whose operation is to be protected from disruptive shutdown due to loss of main power and exhaustion of backup power. The PC or electronic equipment may be used for control in, for example, etching reactors such as capacitively and/or inductively coupled plasma etching reactors, CVD reactors such as ECR or inductively coupled high density plasma deposition systems, wafer transfer equipment, etc. Disruptive shutdown of such processing systems can be very expensive in terms of financial cost, delay, and waste of valuable resources.

In FIG. 1, processing system 10 is powered by a primary power source, which can be but is not limited to, an AC or DC power source. In FIG. 1, this power source is in the form of an AC power source 90 whose power is controlled by Uninterruptible Power Source (UPS) 30. The UPS 30 operates to temporarily provide system backup power when main AC power is lost, and can be a device which is known and conventionally available. The source of the backup power may be a battery 36 or other source of electrical power to the processing system 10, and includes an operating system 70 which can be a part of or separate from the processing system 10.

As FIG. 1 illustrates, an intelligent backup power controller 50 is provided to control the operation of the UPS 30 in accordance with various parameters which insure a graceful shutdown of the system. These parameters include delays provided by first and second counters or timers 53 and 55, and signals from the operating system 70 indicating completion of shutdown procedures by the operating system.

FIG. 2, viewed in conjunction with FIG. 1, shows operational steps of a method in accordance with the invention. In operation, intelligent backup controller 50 monitors the source of power to the processing system 10, (Step 22), which may be indicated by a transition in the UPS 30 from main AC power to backup power or by a separate output signal from the UPS. In the case where the UPS furnishes an AC power loss signal, that signal can be used to indicate that action on the part of the intelligent backup controller 50 in accordance with the invention may be necessary.

Upon determining that the UPS 30 has switched to backup power in Step 27, the intelligent backup controller 50 issues a signal to the operating system 70, in Step 37, which may be used to command the operating system 70 to commence shutdown procedures. Notification of the operating system may take place through a configured interrupt mechanism, as when a PC-ISA based printed circuit board implementation is used, which is illustrated in FIG. 3. It should be noted that the ultimate decision to commence shutdown procedures may be left with the processing system 10 itself, with the intelligent backup controller 50 in effect serving to merely apprise the processing system 10 of the power source status.

Upon the detection of main AC power loss, the backup controller also begins a first timer, indicated in Step 44. This timer is an overriding timer and will cause power shutdown, regardless of whether the procedures to be described below are completed, if power has not been restored. A first timer 55 (FIG. 3) may be provided of this purpose. In a preferred embodiment, a duration of four minutes can be selected for the first timer. While this period is normally sufficient to prevent the depletion of backup power due to operating system or hardware failure such as operating system freeze, the exact value of the timer can be any desired value.

In Step 41, a determination is made whether the operating system 70 has issued a shutdown complete signal indicating that the shutdown tasks have been successfully performed by the operating system. Upon issuance of this shutdown complete signal, a second timer 53 is initiated, which counter provides a delay period, for example 40 seconds, before backup power to the system is turned off. The second delay period gives the operating system time to secure any currently running application or files, since the issuance of the shutdown complete signal, which takes place at higher operating system logic levels, may not take into account inherent time lapses required for complete securing of the files. The second delay period may be provided by the same timer which is used for providing the first delay period.

The graceful shutdown sequence of FIG. 2 is subject to interruption if main AC power is restored. In that situation, the intelligent backup controller 50 would detect the main AC power restoration, which would obviate the need for any shutdown, and abort the shutdown process. Actual power shutdown would thus not take place, although the operating system 70 would have completed its shutdown procedures. The system of the invention would then revert to the initial state monitoring mode of Step 22, and would only begin the graceful shutdown cycle when and if a subsequent AC power loss were detected.

FIG. 3 illustrates a printed circuit board which can be utilized to implement a method in accordance with the invention, in a PC-ISA environment. Of course, other environments are contemplated by the invention, with the appropriate adaptations for compatibility with other standards being within the spirit and scope of the invention. Similarly, the invention may be designed for use with either an external or internal power backup device.

The FIG. 3 embodiment shows a master controller and serial port emulator 34 in communication with an external UPS and an internal battery backup via interfaces 51 and 52. The system is adapted for use with a PC-ISA bus 64 through bus interface logic 23 and is configured to emulate a modem and thereby afford the advantage of eliminating the need for custom device driver software. Thus in operation, the intelligent backup controller of the invention would communicate with the processing system 10 using the same protocols and bus line configurations as a modem and would be perceived by the processing system as a modem. This would eliminate the need to provide custom device driver software, which is normally required to interface the processing system with any additional component.

The master controller and the serial port emulator 34 may be designed into a programmable logic device, with the master controller providing the following functions:

1. Monitoring an AC Fail signal from the external/internal UPS and driving the interrupt line when AC fail is detected and clearing the interrupt when modem status register is read.

2. Controlling the first timer 55, starting the timer when AC Fail status is detected, and resetting the timer when AC returns to normal.

3. Upon receiving the shutdown complete signal, driving the interrupt line to acknowledge the transmitted character and clearing the interrupt when Interrupt Identification register is read.

4. Starting the 40 second timer upon receiving the shutdown complete signal from the system microprocessor.

5. Monitoring the first and second timers and sending a Power Off signal to the UPS when either timer expires and AC Fail status is still valid.

More specifically, the serial communication port emulator section of the programmable logic device emulates a subset of a serial communications controller. It contains the standard set of serial communication controller registers that are 8-bit wide and are accessible by the system microprocessor via the ISA bus. The functions and three-bit local addresses of the registers are summarized as follows:

Transmitter Holding Register (Hex 0, write only)
  When a logic level "1" is written into either Data bit 6 or 5 of this register by the system microprocessor, it is interpreted as command to turn OFF the backup power. The Interrupt Enable Register has to be enabled prior to accepting this command. Bits other than D6 and D5 are ignored.

Receiver Buffer Register (Hex 0, read only)
  Has no function. Will always read 00 Hex.

Divisor Latch LSB (Hex 0 when DLAB set)
  It has no function except it will read the last data written to it.

Divisor Latch MSB (Hex 1 when DLAB set)
  It has no function except it will read the last data written to it.

Interrupt Enable Register (Hex 1)
  Setting D0 enables the controller board.

Interrupt Identification Register (Hex 2)
  D0 will read 0 if an interrupt is pending.
  D1 will read 1 if Transmit buffer Interrupt pending. Modem Status Interrupt is pending if D1 is 0 as long as D0 is also 0.
  Other bits will always read 0.

Line Control Register (Hex 3)
  When D7 is set to 1 Divisor Latch is accessible.

Modem Control Register (Hex 4)
  All commands ignored.

Line Status Register (Hex 5)

Bits D6 and D5 read 1 to indicate Transmitter Shift Register as well as Holding register empty. All other bits read 0.

Modem Status Register (Hex 6)

D7 reads 1 when AC Fails, emulating Data Carrier Detect (DCD).

D3 reads 1 with the first read after AC status change, emulating Delta Data Carrier Detect (DDCD).

All other bits read 0.

Status Control Register (Hex 7)

It reads the last data written to it. D7 will read 0 even when it is written 1 previously to fail the controller initialization test in case the UPS cable is not connected or Low battery conditions.

The bus interface logic (23) is based on ISA standard. It decodes the System Address lines, AEN, IOR and IOW signals. Upon detecting the address the board is designed to respond (Hex 110 through 117) and it enables the data transceivers. It also provides the local address and provides configurable Interrupt Request Driver for the Master Controller.

By minor design changes to the Bus Interface Logic, the controller can easily be adapted to other Bus formats such as PCI and VME buses.

Clock generator 17 provides the base clock for the first and second timers (55 and 53, respectively). The timers are controlled and monitored by the master controller 34.

The external UPS interface 51 provides the connector and the receiver/driver logic for interfacing with the external UPS. The logical level for "Power OFF" control signal is +12 Volts.

The internal backup interface 52 provides the connector and the receiver/driver logic for interfacing with internal battery backup power supplies. Logic level for "Power OFF" control signal is +5 Volts.

According to a preferred embodiment, the controller board is utilized in Lam Research Corporation's Envision™ system which is based on Next Operating System. The Envision™ system is proprietary applications software used for controlling and running the tools (e.g., plasma etching reactors such as capacitively and/or inductively coupled plasma etching reactors, CVD reactors such as ECR or inductively coupled high density plasma deposition systems, wafer transfer equipment, etc.) utilized in semiconductor manufacturing procedures and for providing process status indications for display and control. The controller can also be utilized in other operating system environments, such as Windows NT, without departure from the spirit and scope of the invention.

The above are exemplary modes of carrying out the invention and are not intended to be limiting. It will be apparent to those skilled in the art that modifications thereto can be made without departure from the spirit and scope of the invention as set forth by the following claims.

What is claimed is:

1. A device for effecting processing system shutdown of a semiconductor etching or a semiconductor deposition apparatus by implementing operating system shutdown procedures for the apparatus and turning off backup power to the apparatus, said device comprising:

shutdown control means, for initiating the operating system shutdown procedures in response to a transition in a power source supplying power to the apparatus from a main power source to a backup power source;

first counter means for counting a first delay period of a first predetermined duration, said first delay period commencing with completion of the operating system shutdown procedures;

power shutdown means for performing a shutdown procedure by turning off backup power upon expiration of said first delay period; and aborting means for terminating the shutdown procedure of the power shutdown means if main power is restored before the turning off of backup power by the power shutdown means.

2. The device of claim 1, wherein a second counter means is provided for counting a second delay period of a second predetermined duration, said second delay period commencing upon occurrence of said transition, said power shutdown means performing said shutdown procedure upon expiration of said second delay period.

3. The device of claim 2, wherein the first duration is shorter than the second duration.

4. The device of claim 3, wherein said device comprises a printed circuit board which includes:

a programmable logic device in communication with said operating system through a system bus, said programmable logic device communicating with said system bus as a serial port emulator and adapted to operate as the shutdown control means, the power shutdown means, and the aborting means;

a bus interface logic device for interfacing said programmable logic device with said system bus;

at least one timer for counting said first and second delay periods; and, a power source interface device for interfacing said programmable logic device with said power source.

5. A PCB for initiating shutdown procedures of an operating system of a semiconductor etching or a semiconductor deposition apparatus and switching off backup power from an Uninterruptible Power Supply (UPS) following main AC power failure to the apparatus, said PCB comprising:

a timer, said timer timing a first predetermined duration in response to a first start timer signal; and a master controller, said master controller detecting main AC power failure and issuing to said operating system a failure signal indicative of said AC power failure, said master controller issuing said first start timer signal in response to a shutdown compete signal from the operating system and issuing a power off signal to said UPS at the expiration of said first duration, said power off signal terminating provision of backup power by said UPS, said shutdown complete signal being issued by said operating system upon completion of operating system shutdown procedures.

6. The PCB of claim 5, wherein said timer is adapted to time a second predetermined duration in response to detection of main AC power failure by said master controller, said master controller issuing the power off signal to said UPS at the expiration of said second predetermined duration.

7. The PCB of claim 6, wherein said second duration is longer than said first duration.

8. The PCB of claim 6, wherein said master controller refrains from issuing said power off signal if main AC power is restored.

9. The PCB of claim 5, said PCB further comprising a serial port emulator for emulating a subset of a serial communications controller, said serial port emulator effecting communication between said master controller and said operating system.

10. The PCB of claim 9, wherein said master controller and said serial port emulator comprise a programmable logic device.

11. The PCB of claim 9, said PCB further comprising a bus interface logic device, said bus interface logic device interfacing said master controller with said operating system.

12. The PCB of claim 9, wherein said PCB bus communicates with a system microprocessor through a bus, said serial communications controller containing 8-bit wide serial controller registers accessible by the system microprocessor through the bus.

13. A method for performing graceful shutdown of a data processing system of a semiconductor etching or a semiconductor deposition apparatus upon the loss of main AC power to the apparatus, said method comprising:

sensing a transition from main AC power to backup power;

causing an operating system of said data processing system to commence shutdown procedures in response to said transition;

triggering a first timer in response to said transition, said first timer timing a first duration;

triggering a second timer in response to a signal from said operating system indicating completion of shutdown procedures, said second timer timing a second duration; and terminating provision of backup power at the expiration of either said first duration or said second duration, unless main AC power is restored before the expiration of either said first duration or said second duration.

14. The method of claim 13, wherein said first duration is longer than said second duration.

15. The method of claim 13, wherein said method is performed by a PCB.

16. A device for effecting graceful shutdown of a semiconductor etching or a semiconductor deposition apparatus upon the occurrence of a transition from main power to backup power supplied to the apparatus, the apparatus being operated by an operating system, said device comprising:

monitoring means for detecting the transition;

interruption means for interrupting operation of said operating system in response to detection of said transition by said monitoring means, said operating system commencing shutdown procedures in response to interruption by said interruption means.

17. The device of claim 16, wherein said device further comprises a backup power shutdown means for terminating provision of backup power.

18. The device of claim 17, wherein said backup power shutdown means is responsive to a shutdown complete signal from said operating system, said shutdown complete signal being issued by said operating system at the completion of said shutdown procedures.

19. The device of claim 18, wherein said termination of the provision of backup power occurs after a first predetermined delay following receipt of said shutdown complete signal by said backup power shutdown means.

20. The device of claim 19, wherein said termination of the provision of backup power occurs after a second predetermined delay following detection of said transition by said monitoring means.

21. The device of claim 20, wherein said first predetermined delay is shorter than said second predetermined delay.

* * * * *